(12) United States Patent
Tokarski et al.

(10) Patent No.: US 7,264,544 B2
(45) Date of Patent: Sep. 4, 2007

(54) APPARATUS AND METHOD FOR FIELD DRESSING GAME

(75) Inventors: Thaddeus Tokarski, Tigerton, WI (US); Peter R. Krolow, Tigerton, WI (US)

(73) Assignee: Innovative Sportsman's Products, LLC, Tigerton, WI (US)

( * ) Notice: Subject to any disclaimer, the term of this patent is extended or adjusted under 35 U.S.C. 154(b) by 10 days.

(21) Appl. No.: 11/414,903

(22) Filed: May 1, 2006

(65) Prior Publication Data

US 2006/0276119 A1    Dec. 7, 2006

Related U.S. Application Data

(60) Provisional application No. 60/676,370, filed on Apr. 29, 2005.

(51) Int. Cl.
*A22B 5/00*    (2006.01)
(52) U.S. Cl. ........................................ 452/198
(58) Field of Classification Search .................. None
See application file for complete search history.

(56) References Cited

U.S. PATENT DOCUMENTS

| 370,615 | A | | 9/1887 | Folger |
|---|---|---|---|---|
| 1,172,489 | A | | 2/1916 | Schellinger |
| 1,311,779 | A | | 7/1919 | Shank |
| 3,854,168 | A | * | 12/1974 | Bradley ........................ 452/189 |
| 3,871,084 | A | * | 3/1975 | Carrington et al. ............ 452/128 |
| 3,894,313 | A | * | 7/1975 | Miller .......................... 452/189 |
| 4,580,317 | A | | 4/1986 | Timothy |
| 4,763,942 | A | | 8/1988 | Lyon |
| 4,901,397 | A | | 2/1990 | Pursell et al. |
| 4,909,555 | A | | 3/1990 | Blasi |
| 5,360,368 | A | | 11/1994 | Hajek |
| 5,482,501 | A | * | 1/1996 | Frits ............................. 452/125 |
| 5,562,534 | A | * | 10/1996 | McGough ..................... 452/187 |
| 5,591,077 | A | | 1/1997 | Rowe |
| 5,707,281 | A | | 1/1998 | Hicks |
| 6,132,305 | A | | 10/2000 | Witherell |
| 6,186,882 | B1 | | 2/2001 | Adams et al. |
| 6,569,005 | B2 | * | 5/2003 | Maxwell ....................... 452/128 |
| 6,712,687 | B1 | | 3/2004 | Douglas |
| 2003/0036345 | A1 | | 2/2003 | Connor |
| 2004/0067726 | A1 | | 4/2004 | Douglas |
| 2004/0157542 | A1 | | 8/2004 | Bloch |
| 2004/0225319 | A1 | | 11/2004 | Konyn et al. |

* cited by examiner

*Primary Examiner*—Thomas Price
(74) *Attorney, Agent, or Firm*—Godfrey & Kahn, S.C.

(57) ABSTRACT

An apparatus and method for field dressing game. The apparatus includes an anchor and a cord attached to the anchor. The anchor is adapted to be inserted into the ground, and the cord is adapted to be attached to an animal's leg and to the anchor.

16 Claims, 3 Drawing Sheets

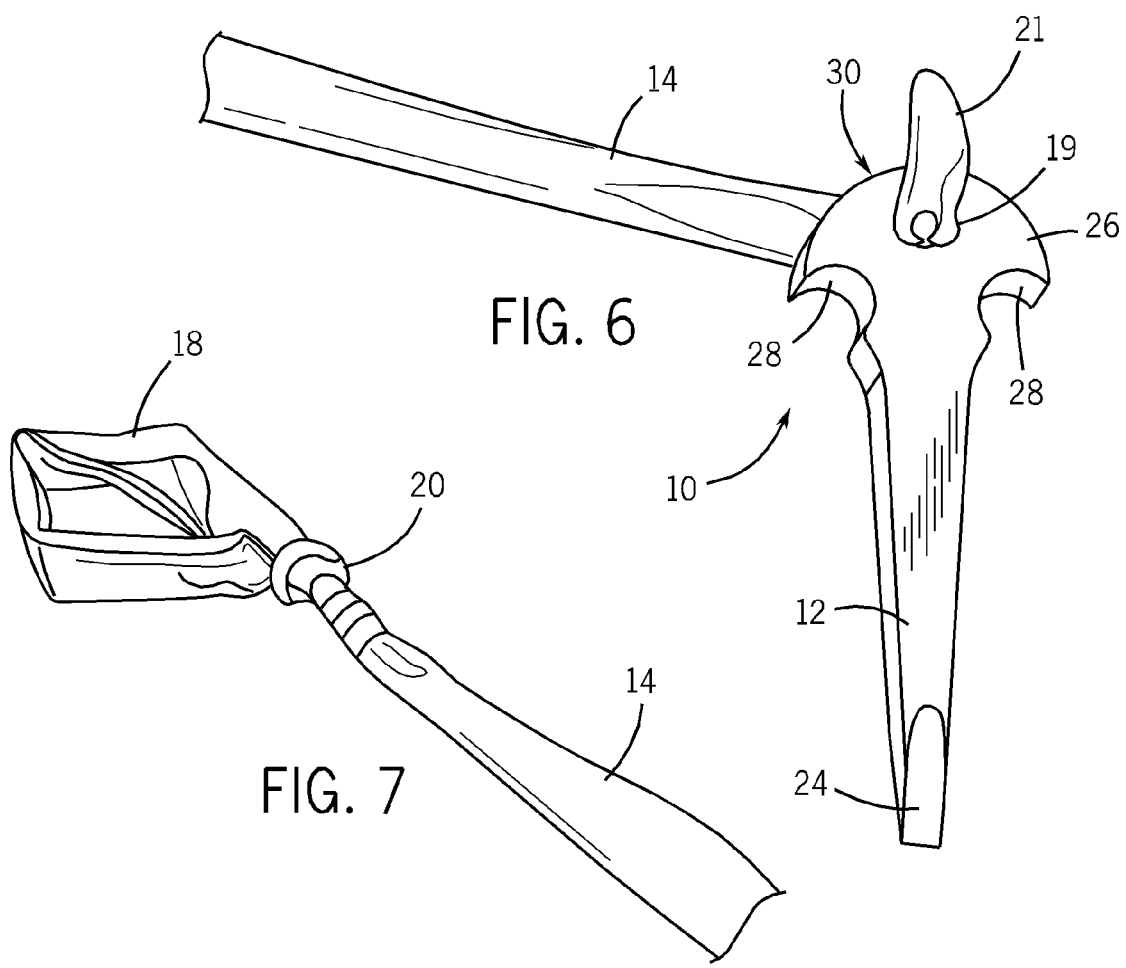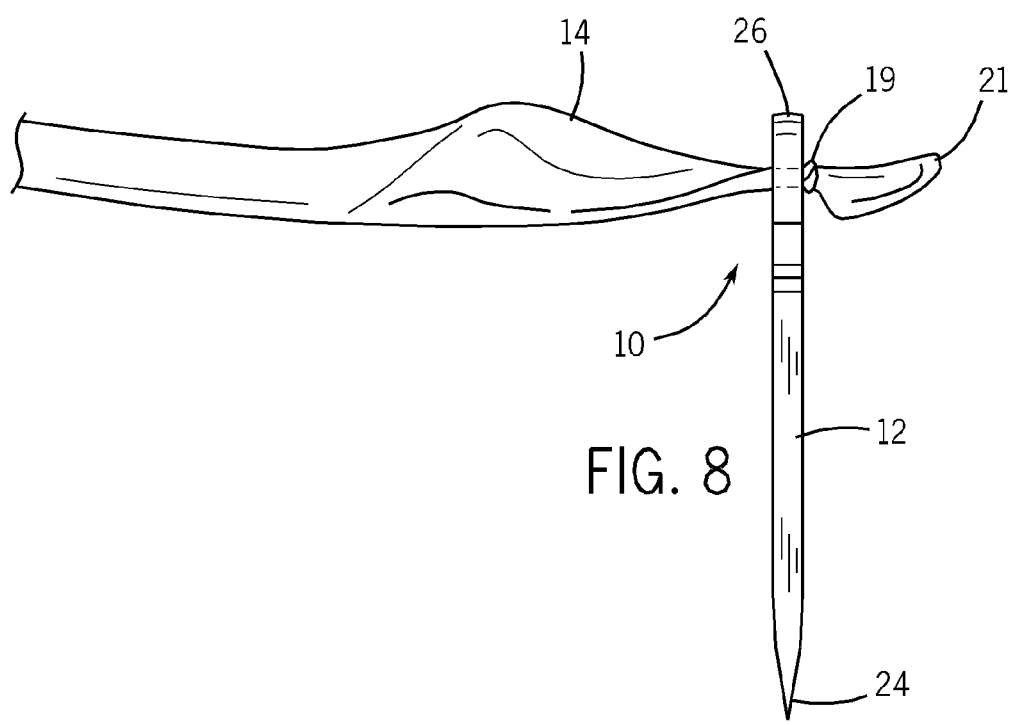

APPARATUS AND METHOD FOR FIELD DRESSING GAME

CROSS REFERENCE TO RELATED APPLICATION

This application claims the benefit of U.S. Provisional Application No. 60/676,370, filed Apr. 29, 2005, incorporated herein by reference.

BACKGROUND OF THE INVENTION

The present invention relates generally to hunting, and more particularly to an apparatus and method for assisting hunters in the field dressing of game.

Field dressing large game, such as deer, elk and moose, can be a difficult task for a single hunter to perform. In particular, with large game is it difficult to both hold the animal's legs apart and use the eviscerating tools at the same time. Hunters thus often call on their hunting companions to help them with the field dressing process. Hunters out in the field without companions, however, do not have this option. Moreover, it can be a burden on the companion hunter, who likely has to descend from his tree stand and possibly miss an opportunity to bring home his own prize buck. Thus, there exists a need for an apparatus and method that allows hunters to easily field dress large game without the aid of companion hunters, and in particular, a need for an apparatus and method for holding an animal's legs apart to facilitate the hunter's use of evisceration tools.

SUMMARY OF THE INVENTION

The present invention provides an apparatus for assisting hunters in the field dressing of game. Specifically, the present invention provides an apparatus for holding an animal's legs apart during the field dressing process. The apparatus includes an anchor and a cord. The anchor is shaped for insertion into the ground. The cord is attached at a first end to the anchor and has at a second end a loop or other device for attaching the cord to an animal's leg. An apparatus according to the present invention can be used on each side of the animal to hold each of the animal's rear legs apart.

The present invention also contemplates a method for field dressing an animal. The method includes the steps of providing a first and second apparatus according to the present invention, attaching the cord of the first apparatus to the animal's right rear leg, inserting the anchor of the first apparatus into the ground, attaching the cord of the second apparatus to the animal's left rear leg, inserting the anchor of the second apparatus into the ground at a distance sufficient to hold the animal's legs apart for evisceration, and eviscerating the animal while the animal is so positioned by the apparatus.

The present invention provides significant advantages over previously described products and methods. Most significantly, the apparatus of the present invention is light and portable, and allows a hunter to easily field dress an animal, including a large animal, by himself and without the aid of his companion hunters. In addition, the apparatus of the present invention provides a safer means for field dressing game. The apparatus stabilizes an animal in a convenient position for field dressing. Thus, the hunter does not need to use his hands, arms or legs to stabilize the animal and keep the animal's body and legs from twisting or otherwise moving around, but can instead concentrate solely on the evisceration process.

Various other features, objects, and advantages of the invention will be made apparent to those skilled in the art from the accompanying drawings and detailed description thereof.

BRIEF DESCRIPTION OF THE DRAWINGS

FIG. 6 is a digital photograph illustrating a partial rear elevation view of one embodiment of the present invention;

FIG. 7 is a digital photograph illustrating a partial front elevation view of one end of the cord of one embodiment of the present invention; and FIG. 8 is a digital photograph illustrating a partial edge elevation view of one embodiment of the present invention.

DETAILED DESCRIPTION OF THE INVENTION

Figure 1:
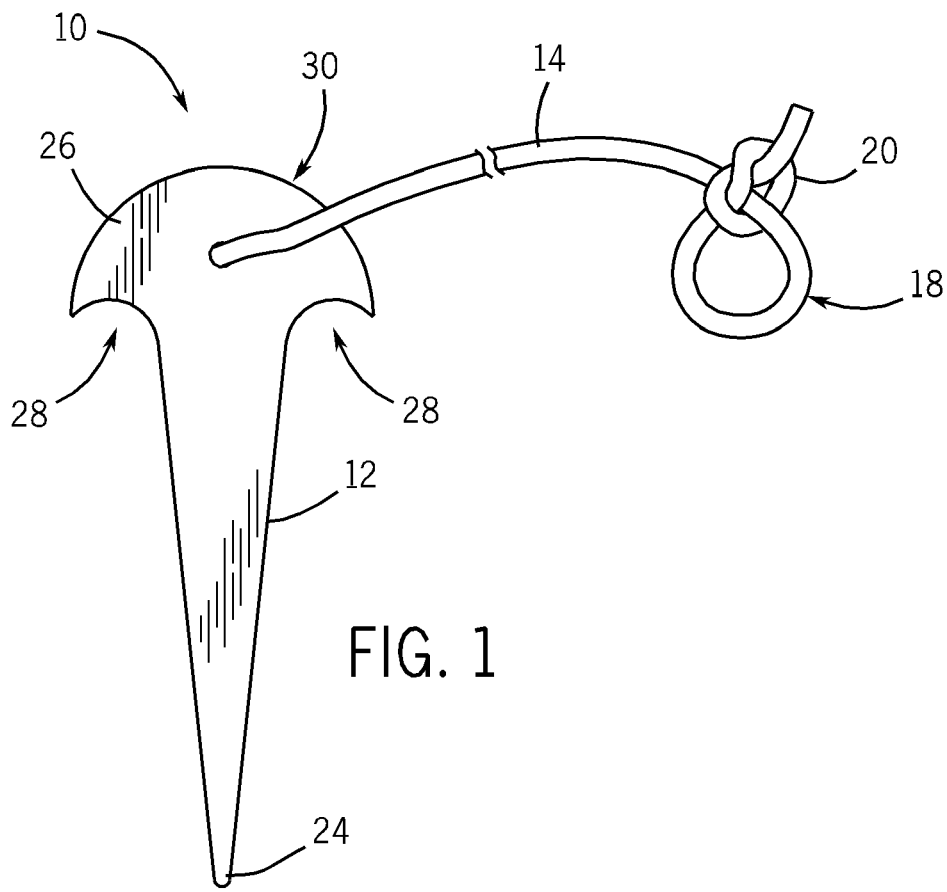
FIG. 1 is a front elevation view of an apparatus constructed according to one embodiment of the present invention.
Figure 2:
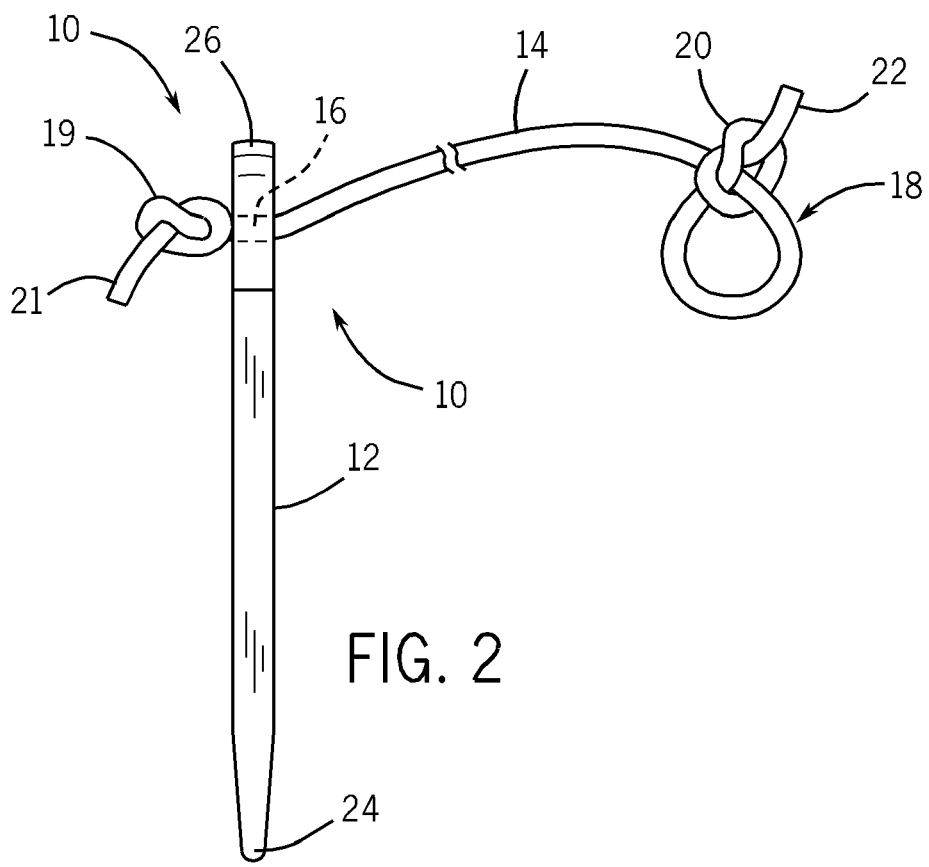
FIG. 2 is an edge elevation view of the apparatus shown in FIG. 1.
Figure 3:
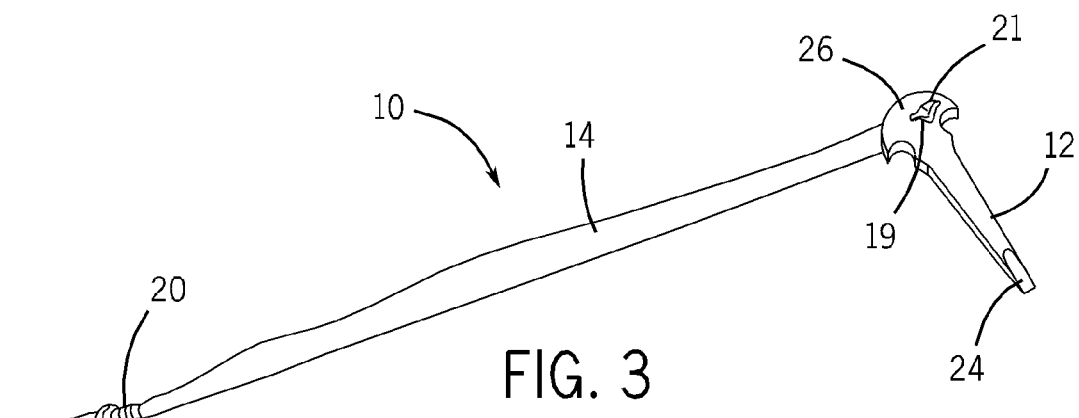
FIG. 3 is a digital photograph illustrating a perspective view of one embodiment of the present invention.
Figure 4:
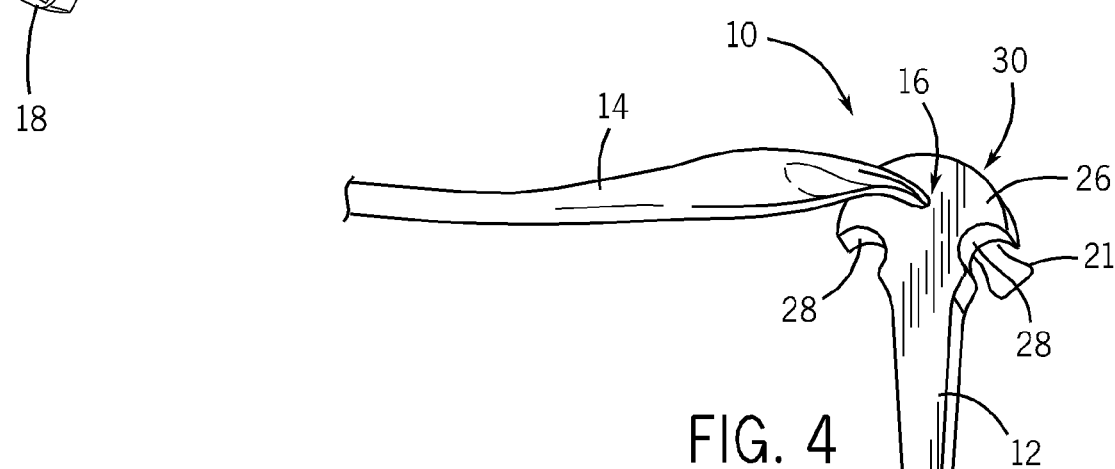
FIG. 4 is a digital photograph illustrating a partial front elevation view of one embodiment of the present invention.
Figure 5:
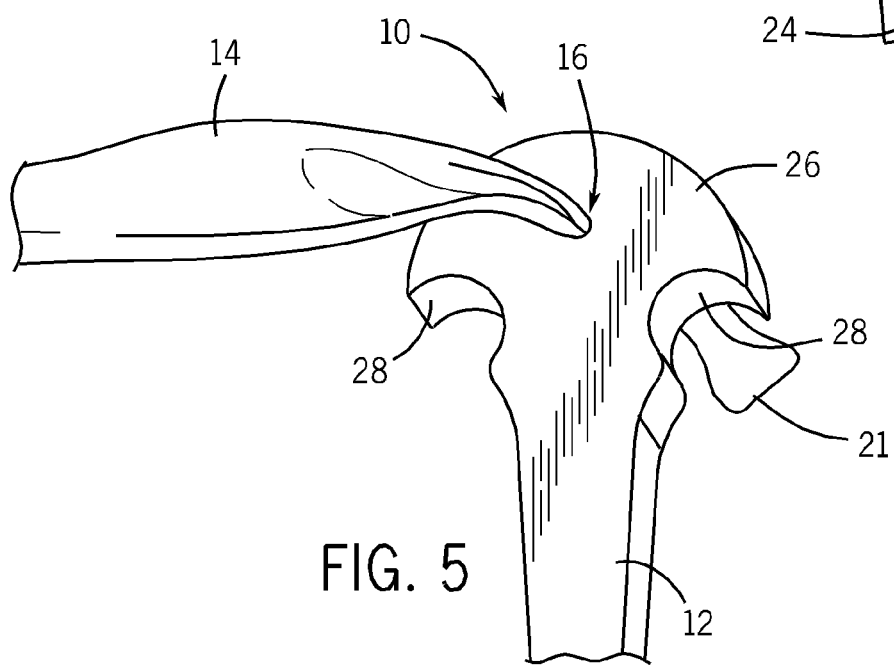
FIG. 5 is a digital photograph illustrating an enlarged partial front elevation view of one embodiment of the present invention.

The present invention provides an apparatus 10 for holding an animal's legs apart during the field dressing process. Referring now to the drawing figures, the apparatus 10 shown includes an anchor 12 and a cord 14. The cord 14 is attached at a first end 21 to the anchor 12, and attaches at a second end 22 to a leg of an animal (not shown).

The cord 14 is attached at first end 21 to the anchor 12 through hole 16 formed in the anchor, and is secured through hole 16 in any suitable manner, preferably by using a knot 19. Cord 14 could be attached to anchor 12 in a number of ways, including without limitation, for example, by the use of mechanical or adhesive fastening devices that may or may not require a hole such as hole 16 formed in anchor 12. The cord 14 also has a loop 18 at second end 22 that can be attached around an animal's leg. In the embodiment shown, the loop 18 is formed by tying a loop 18 in the second end 22 of the cord 14 and securing the loop 18 with knot 20. It has been found effective to use a loop size between 3 and 4 inches in diameter. Many other configurations could also be used to attach the cord 14 to the animal's leg, including but not limited to simply tying the cord around the animal's leg, and the use of a separate element that attaches both to the cord and to the animal's leg. The cord 14 could be made from a number of materials, and is preferably made from an elastic material such as but not limited to elastic polymer strap material or elastic polymer tubing material, though other non-elastic materials such as but not limited to rope could also be used. Elastic materials are preferred because they can be easily stretched to the desired length for properly holding an animal's leg apart, and have an adequate amount of "give" or release once the anchor 12 has been placed in the ground. The material used should also be suitable for hunting conditions, including inclement weather conditions such as rain, extreme cold, and snow.

The anchor 12 has a first end 24 and a second end 26. First end 24 is preferably tapered as shown to facilitate insertion of the anchor 12 into the ground. Second end 26 is preferably shaped to accommodate a hunter's hand to ease the insertion of the anchor 12 into the ground. One way in which the second end 26 can accommodate the hunter's hand is shown in the drawings. Second end 26 has an arcuate top portion 30 to accommodate the hunter's palm, and two radius cut areas 28 below the top portion and along the sides of the anchor 12, to accommodate the hunter's fingers. Such a shape will allow the hunter to easily insert and remove the anchor from the ground. In the embodiment shown, the second end 26 of the anchor 12 also includes hole 16 through which the cord 14 is attached to the anchor 12. Anchor 12 is preferably formed from a plastic material having high impact and mechanical strength properties, such as ABS (Acrylonitrile Butadiene Styrene) plastic, though other materials such as metals, natural materials and composites can also be used. The anchor material, like the cord material, should be able to withstand hunting conditions. The anchor 12 can also be formed in a number of ways, including but not limited to by machining, injection molding, extruding, and casting. Other configurations of the anchor could also be used, such as but not limited to a traditional stake configuration.

In operation, a hunter ideally uses at least two apparatuses 10. The cords 14 of the apparatuses 10 can be wrapped around the anchors 12 so that the apparatuses 10 are easy for the hunter to carry in a pocket or other convenient location. The hunter attaches the cord 14 of a first apparatus to one leg, such as the right rear leg, of the animal to be field dressed. The hunter then inserts the anchor 12 of the first apparatus into the ground at a location that will pull the animal's leg away from the animal's body. Generally, when pulling back a right rear leg, the anchor 12 will be placed to the right of the animal's body, and when pulling back a left rear leg, the anchor 12 will be placed to the left of the animal's body. The anchor 12 can ideally be inserted using the hunter's hand, foot, or a tool such as a small hammer. The hunter then repeats those steps for the second apparatus, namely, attaches the cord 14 of the second apparatus to the other leg, such as the left rear leg, of the animal, and inserts the anchor 12 of the second apparatus into the ground at a location that will pull the animal's leg away from the animal's body. Once the anchors 12 of both apparatuses are inserted into the ground, the animal's legs are held apart and the hunter can then proceed to eviscerate or field dress the animal.

Although the embodiments described are directed to use of the apparatuses to assist hunters in field dressing, the apparatus and method are useful for other purposes as well. For example, dairy and livestock farmers dealing with large animals may also have a need for holding back the legs of those large animals, and thus, the apparatus would be suitable for that purpose as well.

While the invention has been described with reference to preferred embodiments, those skilled in the art will appreciate that certain substitutions, alterations and omissions may be made to the embodiments without departing from the spirit of the invention. Accordingly, the foregoing description and embodiments discussed are meant to be exemplary only, and should not limit the scope of the invention.

What is claimed is:

1. A method for field dressing a game animal, the method comprising the steps of:
providing a first and a second apparatus, each apparatus comprising:
an anchor having a first end to be inserted into the ground and a second end for facilitating such insertion; and
a cord having a first end and a second end, the first end of the cord attached to the anchor;
attaching a cord of the first apparatus to a first leg of an animal;
inserting an anchor of the first apparatus into the ground to pull the first leg away from the animal's body and secure the first leg in the pulled away position;
attaching a cord of the second apparatus to a second leg of the animal;
inserting an anchor of the second apparatus into the ground to pull the second leg away from the animal's body and secure the second leg in the pulled away position apart from the first leg; and
eviscerating the animal.

2. The method of claim 1 wherein each of the first and second cords is attached to the animal's leg by tying the cord around the animal's leg.

3. The method of claim 1 wherein each of the first and second cords is attached to the animal's leg using a separate attachment element.

4. The method of claim 1, wherein each of the first and second cords is attached to the anchor through a hole in the anchor.

5. The method of claim 1, wherein the anchor of the first apparatus is inserted into the ground on a first side of the animal.

6. The method of claim 1, wherein the anchor of the second apparatus is inserted into the ground on a second side of the animal.

7. The method of claim 1, wherein each of the first and second anchors of the first apparatus is inserted into the ground on a first side of the animal, and each of the anchors of the second apparatus is inserted into the ground on a second side of the animal, the second side opposite the first side such that the animal's first and second legs are held apart from one another by the first and second apparatuses.

8. An apparatus for holding an animal's legs apart, the apparatus comprising:
a first anchor and a second anchor;
a first cord attached to the first anchor and a second cord attached to the second anchor;
a first loop attached to the first cord and a second loop attached to the second cord for facilitating attachment of the first cord to a first leg of the animal and attachment of the second cord to a second leg of the animal; and
wherein the first anchor is inserted into the ground on a first side of the animal such that the first cord pulls the animal's leg away from the animal's body in a first direction and the second anchor is inserted into the ground on a second side of the animal such that the second cord pulls the animal's leg away from the animal's body in a second direction substantially opposite the first direction such that the animal's legs are secured in a pulled apart position.

9. The apparatus of claim 8, wherein each of the first and second anchors has a first end shaped for insertion into the ground and a second end shaped to accommodate a hunter's hand.

10. The apparatus of claim 9, wherein the second end of each of the first and second anchors has an arcuate top portion and at least one radius cut area below the arcuate top portion.

11. The apparatus of claim 9, wherein the first end of each of the first and second anchors is tapered.

12. The apparatus of claim 9, wherein the first end of each of the first and second anchors is tapered and the second end of each of the first and second anchors has an arcuate top portion and two radius cut areas.

13. The apparatus of claim 8, wherein each of the first and second anchors is formed from a plastic material.

14. The apparatus of claim 8, wherein each of the first and second anchors is formed using an injection molding process.

15. The apparatus of claim 8, wherein each of the first and second cords is made from an elastic material.

16. The apparatus of claim 8, wherein each of the loops is between 3 and 4 inches in diameter.

* * * * *